United States Patent [19]

Fahl

[11] Patent Number: 5,005,602
[45] Date of Patent: * Apr. 9, 1991

[54] POPPET VALVE ASSEMBLY
[75] Inventor: Richard L. Fahl, Fairfield, Ohio
[73] Assignee: Dover Corporation, New York, N.Y.
[*] Notice: The portion of the term of this patent subsequent to Mar. 21, 2006 has been disclaimed.
[21] Appl. No.: 381,578
[22] Filed: Jul. 18, 1989

Related U.S. Application Data

[60] Continuation-in-part of Ser. No. 312,888, Feb. 17, 1989, abandoned, which is a continuation of Ser. No. 90,617, Aug. 28. 1987, Pat. No. 4,813,449, said Ser. No. 90,617, is a division of Ser. No. 813,250, Dec. 24, 1985, Pat. No. 4,693,268.

[51] Int. Cl.⁵ .................. F16K 1/12; F16K 31/52; F16K 35/02
[52] U.S. Cl. ............... 137/219; 137/614.06; 251/98; 251/259; 251/263
[58] Field of Search ................ 137/219, 614.06; 251/98, 99, 259, 263

[56] References Cited

U.S. PATENT DOCUMENTS

| | | | |
|---|---|---|---|
| 1,196,587 | 8/1916 | Robinson | 251/98 |
| 3,987,812 | 10/1976 | Nelson | 137/219 |
| 4,040,456 | 8/1977 | DeFrees | 251/323 X |
| 4,126,294 | 11/1978 | Defrees | 251/99 |
| 4,313,590 | 2/1982 | Nishimiya | 251/323 X |
| 4,813,449 | 3/1989 | Fahl | 137/219 |

OTHER PUBLICATIONS

Emco Wheaton F501 parts List.

Primary Examiner—Gerald A. Michalsky
Attorney, Agent, or Firm—Kinney & Schenk

[57] ABSTRACT

A poppet valve assembly and method of making same are provided and such assembly comprises a housing; a flow passage in the housing with the passage having a central axis and being adapted to flow a fluid in either direction therethrough; a poppet structure for controlling flow through the passage; a support structure for supporting the poppet structure during movement thereof along the axes; an actuator contact on the poppet structure between its head and stem to enable movement of the poppet structure along the axes; and apparatus for engaging the contact to provide the movement wherein the support structure comprises a cylindrical inside surface provided on the housing and having an axial length generally of the order of several times the particular diameter, and the support structure also comprises a cylindrical outside surface on the stem which slideably engages the inside surface, with the inside and outside surfaces cooperating and defining sole means confining the poppet structure against movements transverse the axes during movement of the poppet structure along the axes.

3 Claims, 7 Drawing Sheets

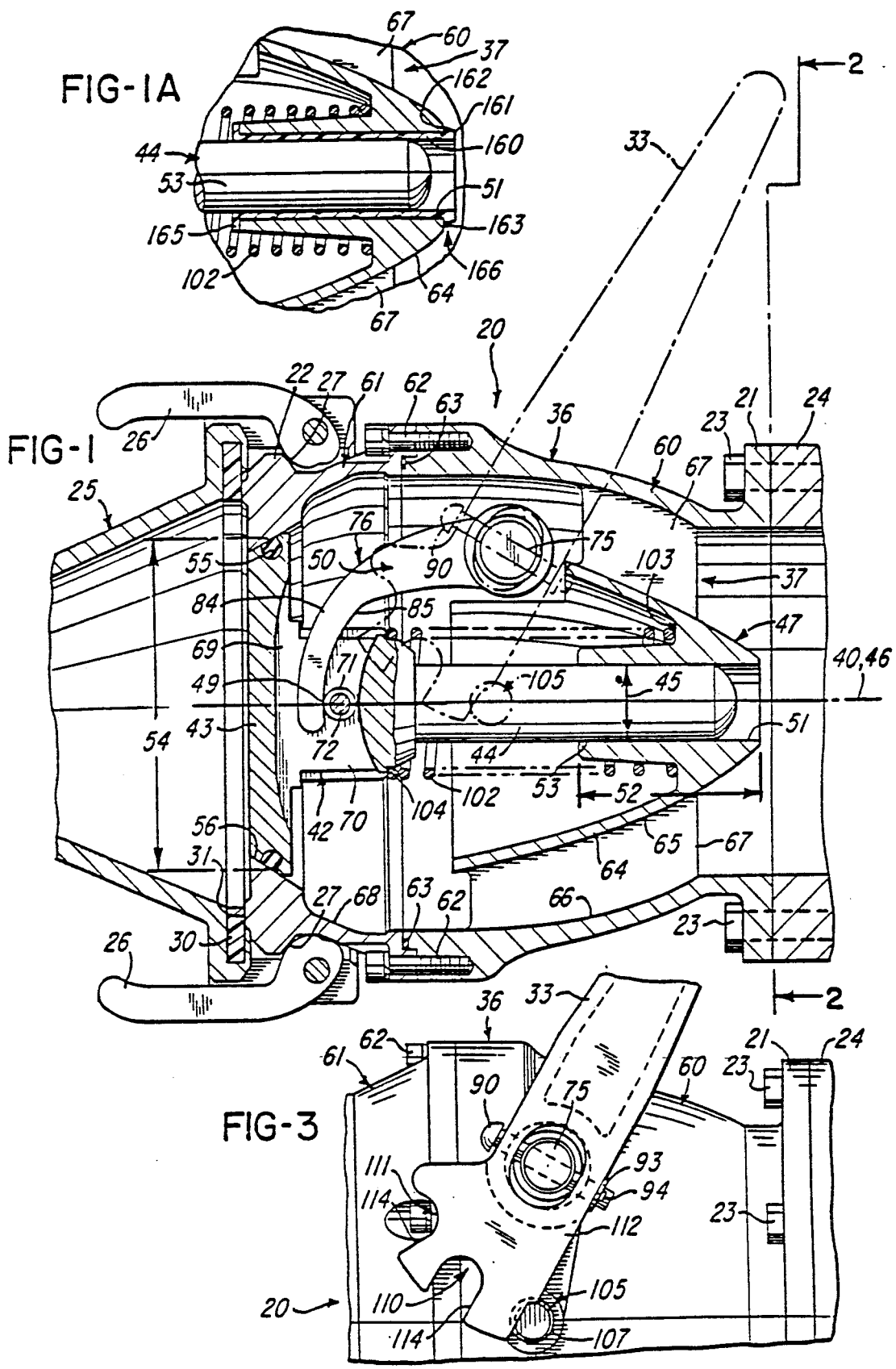

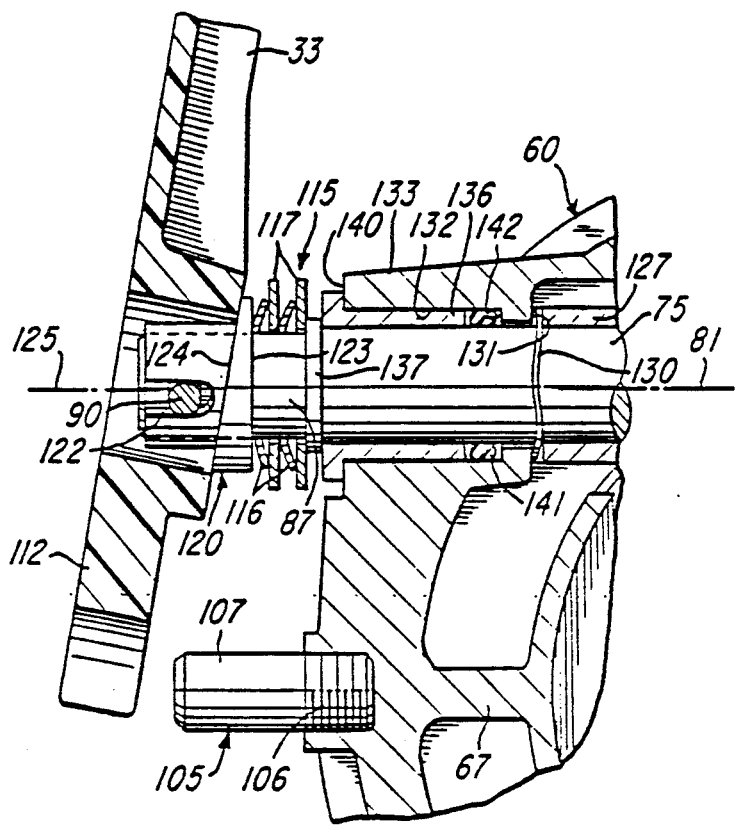
FIG-4
FIG-2
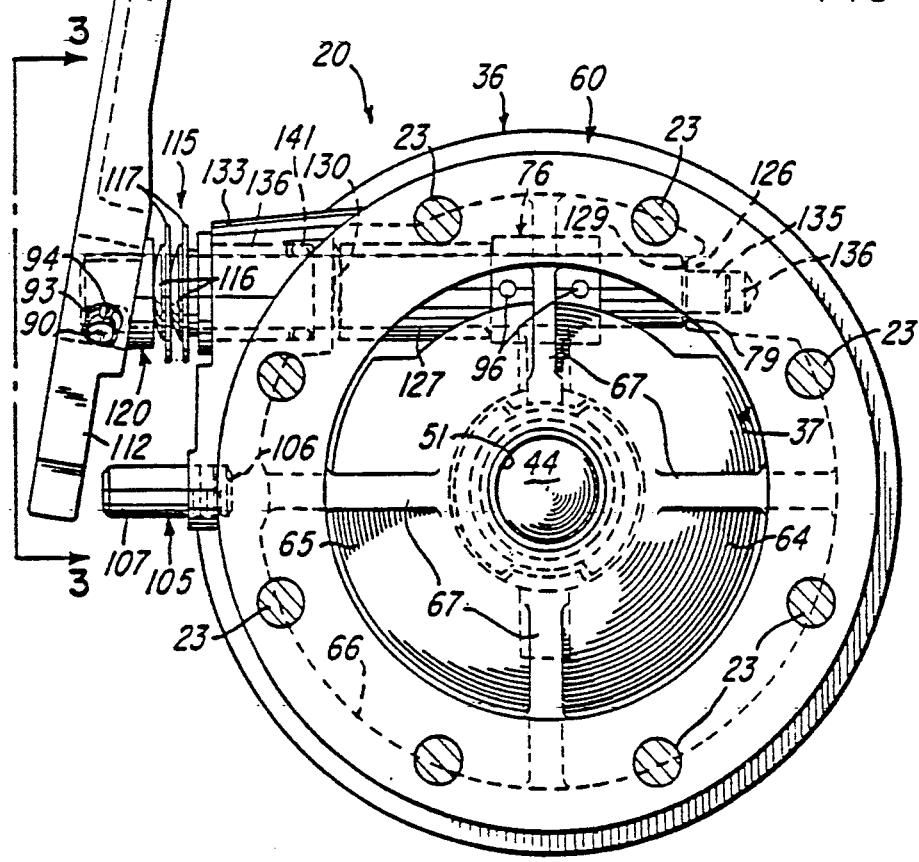

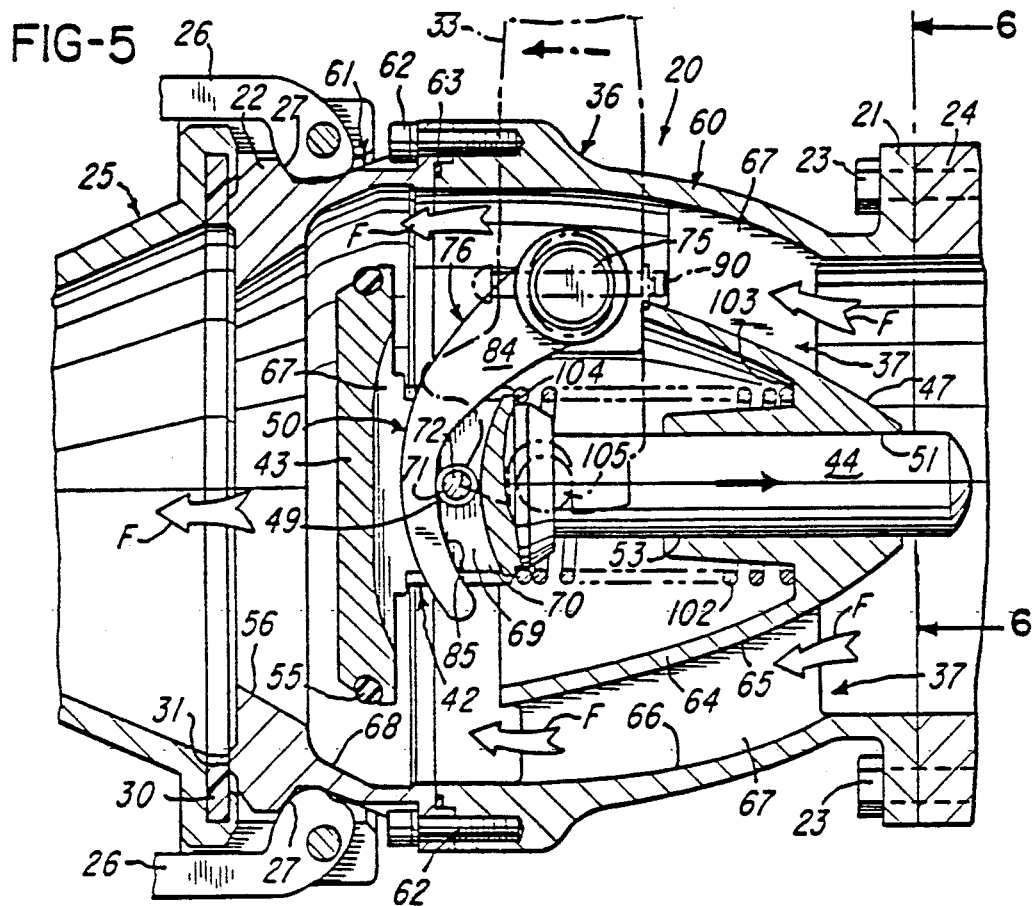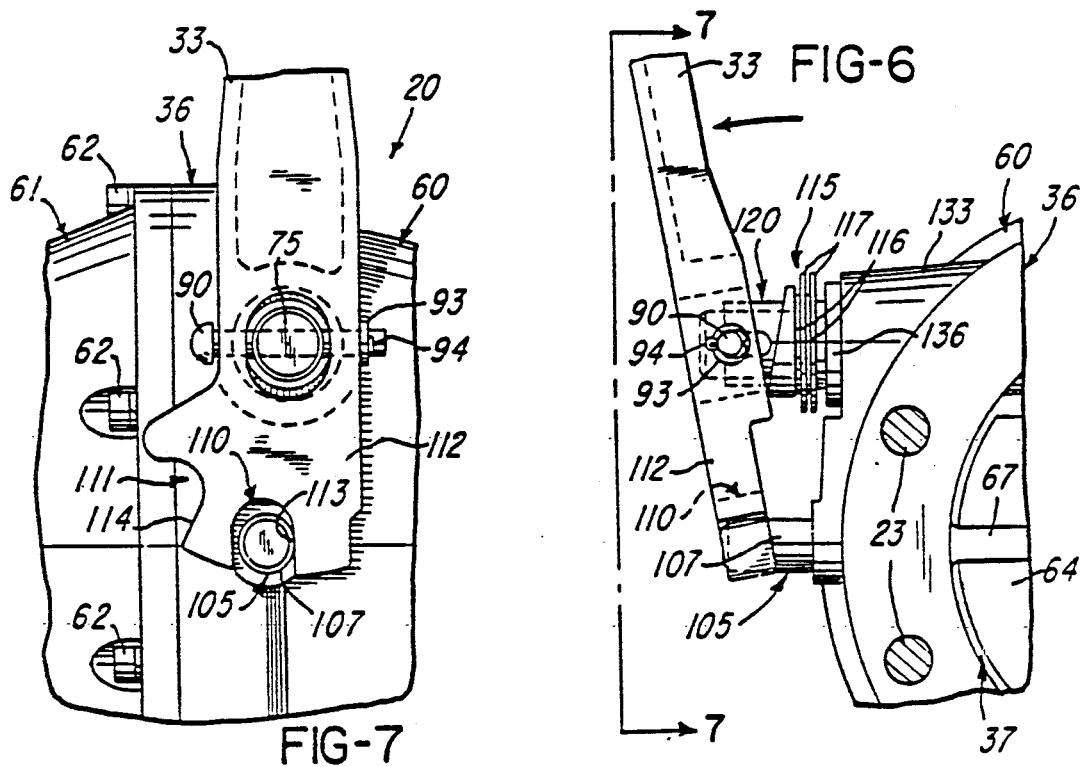

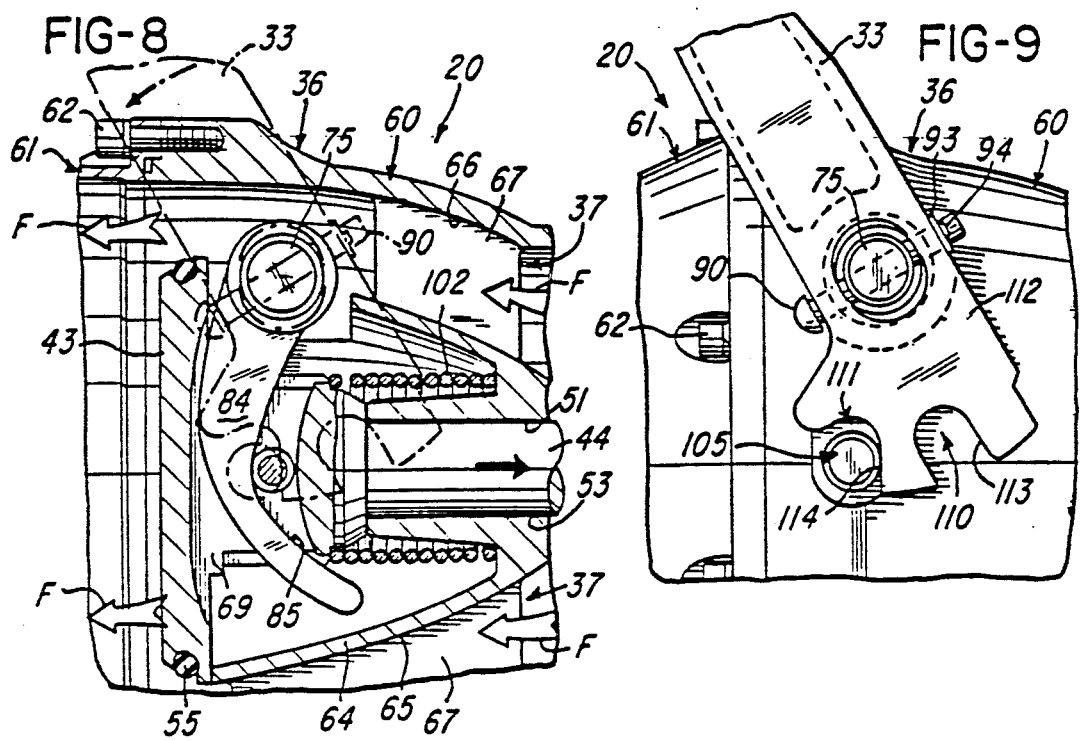
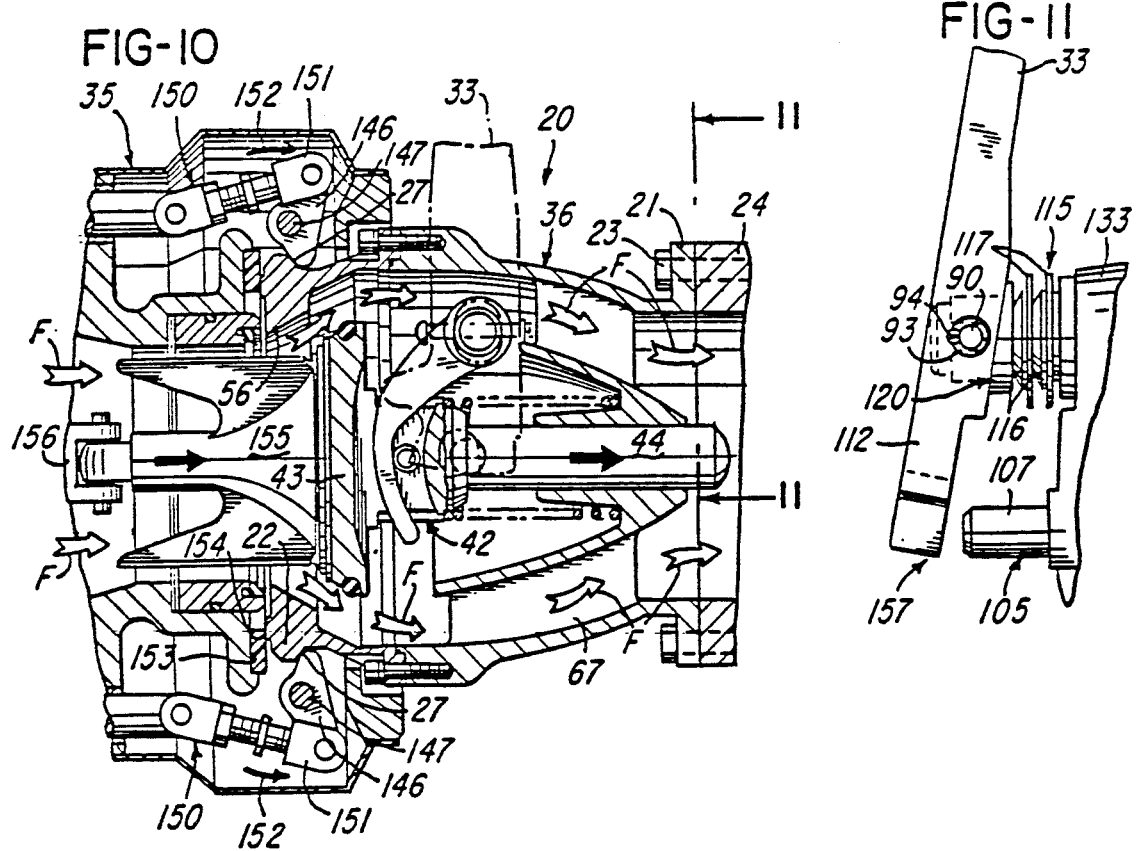

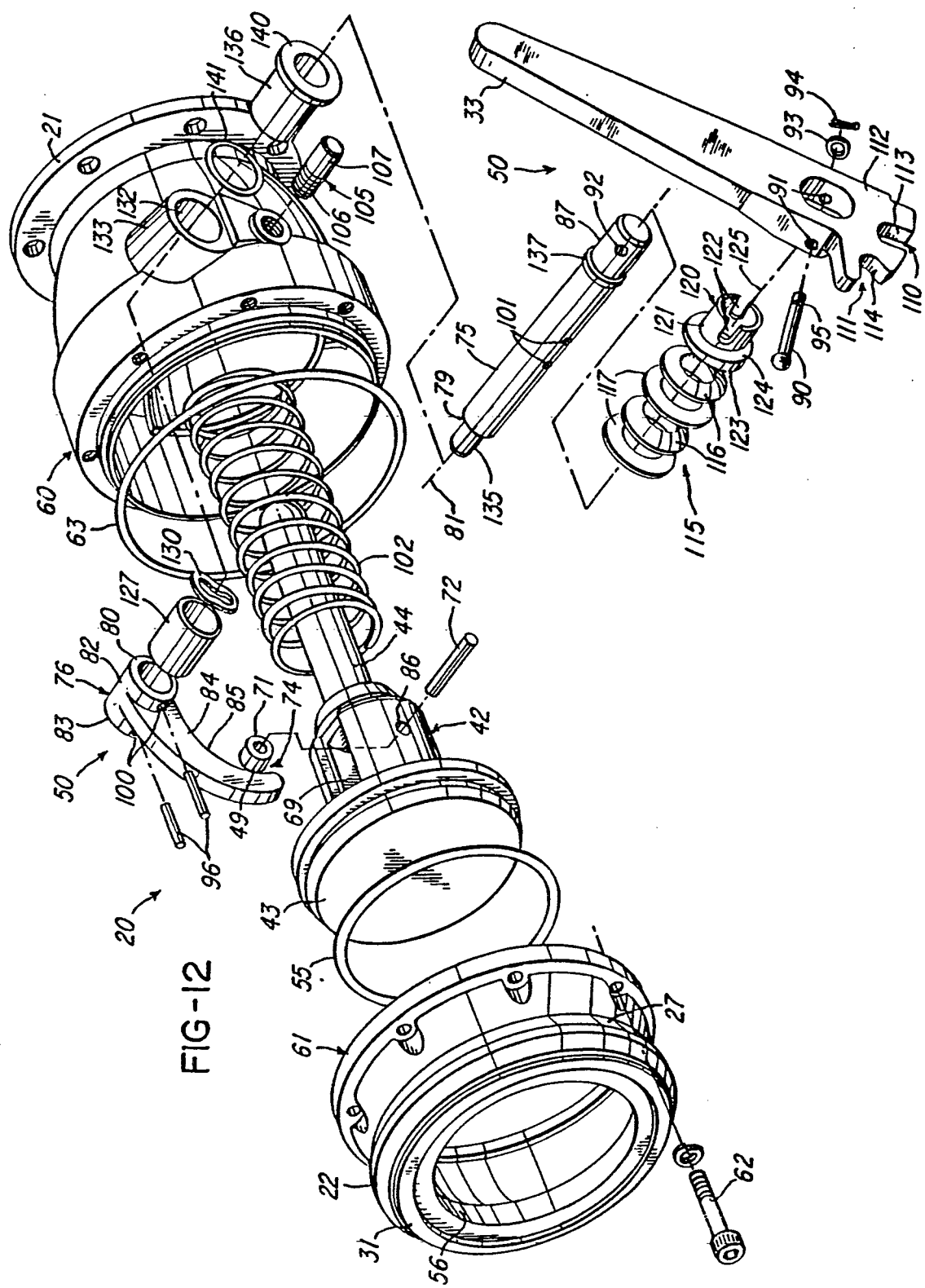

POPPET VALVE ASSEMBLY

CROSS REFERENCE TO RELATED APPLICATIONS

The present application is a continuation-in-part of copending application Ser. No. 312,888 filed Feb. 17, 1989, now abandoned, which was a continuation application of application Ser. No. 90,617, filed Aug. 28, 1987, now U.S. Pat. No. 4,813,449, said application Ser. No. 90,617 being a divisional application of application Ser. No. 813,250, filed Dec. 24, 1985, now U.S. Pat. No. 4,693,268.

BACKGROUND OF THE INVENTION

1. Field of the Invention

This invention rebates to a new poppet valve assembly for controlling flow therethrough of a fluid, such as gasoline, into a gasoline tank truck for filling same and out of such tank truck into an underground storage tank at a filling station, and the like, and to a new method of making such a poppet valve assembly.

2. Prior Art Statement

It is known in the art to provide a poppet valve assembly comprising; a housing; a flow passage in the housing with the passage having a central axis and being adapted to flow fluid in either direction therethrough; a poppet structure for controlling fluid flow through the passage with the poppet structure having a head, a cylindrical stem of a particular diameter, and a longitudinal axis which coincides with the central axis; means supporting the poppet structure during movement thereof along the axes; an actuator contact on the poppet structure between the head and stem to enable movement of the poppet structure along the axes; and means for engaging the contact to provide the said movement.

SUMMARY OF THE INVENTION

One feature of this invention is to provide a new supporting means for a poppet structure of a poppet valve of the character mentioned which allows free and unobstructed opening and closing movements of such poppet structure yet prevents movements thereof transverse the axis of the poppet structure.

In known poppet valve assembly mentioned in the prior art statement the means provided for supporting the poppet structure during movement thereof along its axis and the flow axis of its associated flow passage consists of guides in the housing associated with the poppet structure and such guides are expensive to provide and difficult to manufacture with the required precision.

However, it has been found in accordance with the teachings of this invention that supporting means for a poppet structure of a poppet valve of the character mentioned may be in the form of a cylindrical inside surface provided on the housing for the poppet valve with such cylindrical inside surface having an axis extending coaxially with the axis of the poppet structure and its flow passage and with such inside surface having an axial length generally of the order of several times the diameter of the stem of the poppet structure and with the supporting means further comprising a cylindrical outside surface on such stem which slidably engages the inside surface and with the inside and outside surfaces cooperating and defining sole means confining the poppet structure against movements transverse the axes during movement of the poppet structure along said axes.

In particular, one embodiment of this invention provides a poppet valve assembly comprising; a housing; a flow passage in said housing with the passage having a central axis and being adapted to flow fluid in either direction therethrough; a poppet structure for controlling fluid flowing through the passage with the poppet structure have a head, a cylindrical stem of a particular diameter, and a longitudinal axis which coincides with the central axis; means supporting the poppet structure during movement thereof along the axes; and actuator contact on the poppet structure between the head and the stem to enable movement of the poppet structure along the axes; and means for engaging said contact to provide said movement; with the supporting means comprising a cylindrical inside surface provided on the housing and having axis extending coaxially with the axes and having an axial length generally of the order of several times the particular diameter, and the supporting means further comprising a cylindrical outside surface on the stem which slidably engages the inside surface, with the inside and outside surfaces cooperating and defining sole means confining the poppet structure against movements transverse said axis during movement of said poppet structure along said axes.

Another feature of this invention is to provide a new poppet valve assembly which has unique means for engaging a contact on a poppet structure to provide movement between its closed and open positions.

It has also been found that in the known poppet valve assembly mentioned in the prior art statement the means provided for engaging a contact on a poppet structure to provide movement of such poppet structure from its closed to open positions consists of a shaft carried by the valve assembly housing for rotary movements thereof and an actuator detachably fastened to the shaft and wherein the shaft is held in position by an ordinary retaining ring which does not provide optimum results. In addition, in such known poppet valve assembly a comparatively complex operating handle, and associated structure, are required.

However, it has been found according to the teachings of this invention that the means for engaging a contact on a poppet structure t provide movement of such poppet structure may be in the form of a shaft carried by the valve assembly housing for rotary movements thereof and an actuator detachably fastened to the shaft with the shaft and actuator having outer annular surfaces which together define the sole means engaging structural portions associated with its associated valve assembly housing to hold the shaft and actuator against movements parallel to a central axis of the shaft while allowing the rotary movements of the shaft to enable the actuator to engage with the said contact.

Thus, in accordance with another embodiment of this invention a poppet valve assembly is provided which comprises a housing; a flow passage in the housing with the passage having a central axis and being adapted to flow fluid in either direction therethrough; a poppet structure for controlling fluid flow through the passage with the poppet structure having a head, a cylindrical stem of a particular diameter, and a longitudinal axis which coincides with the central axis; means supporting the poppet structure during movement thereof along the axes; an actuator contact on the poppet structure between the head and the stem to enable movement of the poppet structure along the axes; and means for engaging the contact to provide the said movement wherein the engaging means comprises a shaft carried by said housing for rotary movements thereof and an actuator detachably fastened to said shaft, with the shaft and actuator having outer annular surfaces which together define the sole means engaging structural portions associated with said housing to hold said shaft and actuator against movements parallel to a central axis of said shaft while allowing said rotary movements of said shaft to enable said actuator to engage said contact.

In accordance with another embodiment of the invention, the poppet valve assembly comprises the poppet valve structure above referenced and in which the control mechanism for the poppet actuator comprises an actuating shaft. A bearing bushing is mounted on the poppet valve housing, the actuating shaft being jounaled thereby and projecting outwardly therefrom. A handle is mounted on the outer end of the actuating shaft to rotate the actuating shaft and displace the poppet to an open position. The handle is pivotal relative to the actuating shaft to engage a locking portion with a stop pin and hold the poppet in an open position.

A washer slidably mounted on the actuating shaft includes means for maintaining it in fixed angular relation with the handle for rotating the actuating shaft. A spring is disposed between this washer and the bearing bushing. This washer also includes a projection which is yieldingly held in engagement, by the actuating shaft spring, to pivot the handle so that its locking portion is clear of the stop pin employed in locking the poppet structure in an open position.

The control mechanism is further characterized by the bushing having a counterbore. A felt washer disposed in said counterbore, and a structural washer disposed between the felt washer and said actuating shaft spring.

A further feature of the invention is found in the provision of a plurality of longitudinal grooves in the bearing surface of the bearing bushing to receive dirt particles and thus minimize wear of said surface and the mating surface of the actuating shaft.

Accordingly, it is an object of this invention to provide a new poppet valve assembly having one or more of the novel features of this invention as set forth above or hereinafter shown or described.

Another object of this invention is to provide a new method of making such a poppet valve assembly, the method of this invention having one or more of the novel features of this invention as set forth above or hereinafter shown or described.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which FIG. 1 is a view with parts in cross section, parts in elevation, parts shown in dotted lines, and parts broken away illustrating one exemplary embodiment of a poppet valve assembly of this invention with one end of such valve assembly installed on a flange of a gasoline tank truck and with the valve assembly being shown in its closed position; and, such valve assembly has an unload coupler coupled thereto at its opposite end for flow of gasoline from the tank truck through the valve assembly and unload coupler into a gasoline storage tank, or the like;

FIG. 1A is a modification of the valve assembly of FIG. 1;

FIG. 2 is a view taken essentially on the 2—2 of FIG. 1;

FIG. 3 is a view taken essentially on the line 3—3 of FIG. 2;

FIG. 4 is an enlarged fragmentary view of the upper left-hand portion of FIG. 2 particularly illustrating a handle used to open and close the poppet valve assembly and certain structure associated with such handle;

FIG. 5 is a view similar to FIG. 1 showing the poppet valve assembly in a partially open unloading position;

FIG. 6 is a view taken essentially on the line 6—6 of FIG. 5;

FIG. 7 is a view taken essentially on the line 7—7 of FIG. 6;

FIG. 8 is a view similar to the central portion of FIG. 5 showing the poppet valve assembly in a fully open unload position;

FIG. 9 is a view similar to FIG. 7 showing the lower portion of the handle and an associated stop in the valve assembly position of FIG. 8 with the showing in FIG. being similar to the showing in FIG. 7;

FIG. 10 is a view of the poppet valve assembly with its one end installed on the flange of a gasoline tank truck but with a load coupler being coupled thereto at its opposite end, and showing the loading of gasoline through the valve assembly into the tank of the tank truck;

FIG. 11 is a view taken essentially on the line 11—11 of FIG. 10;

FIG. 12 is an exploded isometric view of the poppet valve assembly of FIG. 1.

DESCRIPTION OF PREFERRED EMBODIMENTS

Figure 13:
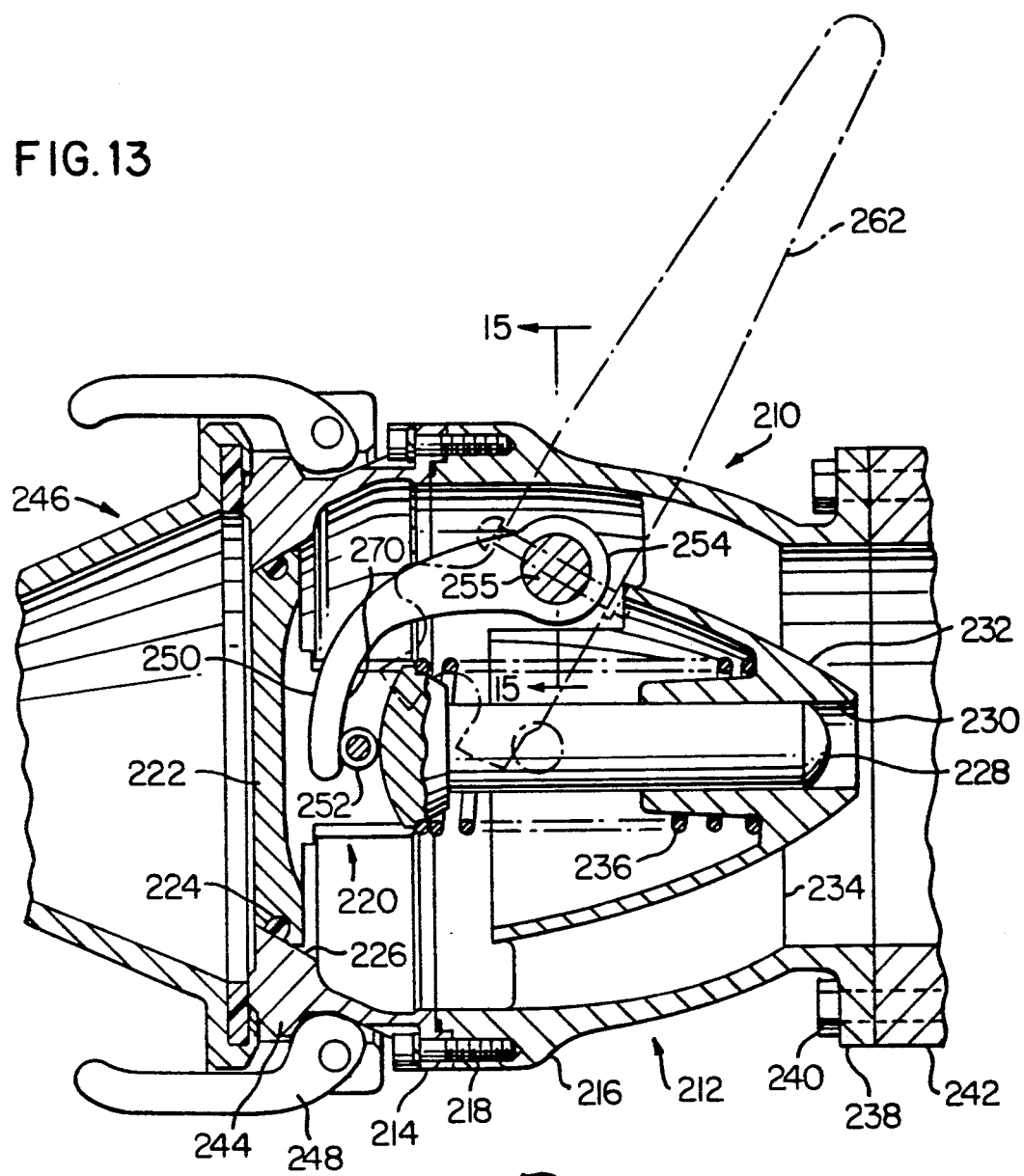
FIG. 13 is a view similar to FIG. 1 illustrating an alternate mechanism for controlling the poppet valve.

While the various features of this invention are hereinafter illustrated and described as being particularly adapted to provide a poppet valve assembly for use with tank truck equipment in dispensing and flowing gasoline and the like therethrough in a manner known in the art, it is to be understood that the various features of this invention can be utilized singly or in various combinations thereof to provide poppet valve assemblies for dispensing other fluids and in other applications, as desired.

Therefore, this invention is not to be limited to only the embodiments illustrated in the drawings, because the drawings are merely utilized to illustrate one of the wide variety of uses of this invention.

Reference is now made to FIG. 1 of the drawings which illustrates one exemplary embodiment of a poppet valve assembly of this invention which is designated generally by the reference numeral 20. The valve assembly 20 is particularly adapted to be used with tank truck equipment such as gasoline tank trucks used to haul gasoline to a gasoline service station for motor vehicles such as automobiles, trucks, and the like.

The valve assembly 20 has a flange end terminating in a flange 21 defining one end thereof and an adapter end terminating in an adapter flange 22 at its opposite end. The flange 21 is particularly adapted to be fastened by a plurality of threaded bolts 23 to a truck flange 24 provided on a gasoline tank truck (not shown) and the truck flange 24 is in fluid flow communication, in a manner known in the art, with a gasoline tank of such tank truck to enable gasoline from within the tank to flow through the valve assembly upon opening thereof and as will be described in more detail subsequently.

The adapter flange 22 is particularly adapted to have a so-called unload coupler 25, of any suitable type known in the art, detachably fastened thereto by a plurality of cam levers 26 having clamping ends which engage an annular surface 27 on the adapter flange 22 and hold the unload coupler 25 so that an annular gasket seal 30 thereof is in fluid-tight engagement against an annular planar end surface 31 of the adapter flange 22. With the unload coupler 25 fastened in sealed relation with its seal 30 against annular surface 31 the valve assembly 20 is opened utilizing a manually operated actuating handle 33 thereof to thereby enable a fluid, such as gasoline, to flow from the tank in the tank truck through the truck flange 21, valve assembly 20, unload coupler 25, and into an underground gasoline storage tank of the type utilized at a gasoline filling station and as is known in the art. The adapter flange 22 is also particularly adapted to have a so-called load coupler, which is designated generally by the reference numeral 35 in FIG. 10 of the drawings, detachably fastened thereto and such load coupler 35 will be described in more detail subsequently.

The valve assembly 20 comprises a housing which is designated generally by the reference numeral 36 and a flow passage in the form of a substantially annular flow passage 37 is provided through the housing and such passage has a central axis 40. The flow passage 37 is adapted to flow fluid such as gasoline in either direction therethrough. In particular, when utilizing the valve assembly 20 with unload coupler 25 fluid flow is from right to left as shown in FIG. 5; and, when utilizing the valve assembly 20 in connection with load coupler 35 fluid flow is from left to right as shown in FIG. 10.

The valve assembly 20 comprises a poppet structure which is designated generally by the reference numeral 42 in FIGS. 1 and 12, and such poppet structure is provided for controlling fluid flow through the passage 37. The poppet structure 42 has a poppet head 43, a cylindrical stem 44 of a particular diameter 45, and a longitudinal axis 46 which coincides with the central axis 40.

The valve assembly 20 also has means, designated generally by the reference numeral 47 in FIG. 1, supporting the poppet structure 42 during movement thereof along the coinciding axes 40 and 46; and, the valve assembly 20 has an actuator contact 49 on the poppet structure between the head 43 and stem 44 thereof to enable movement of the poppet structure 42 along the axes 40 and 46. The valve assembly 20 also has engaging means 50 for engaging the contact 49 to provide the said movement of the poppet structure 42 and such engaging means 50 will be described in more detail subsequently.

In accordance with the teachings of this invention the supporting means 47 of the valve assembly 20 comprises a cylindrical inside surface 51 provided on the housing 36 and such cylindrical inside surface 51 has an axis which extends coaxially and coincides with the axes 40 and 46 and such surface 51 has an axial length 52 which is generally of the order of several times the particular diameter 45 of the stem 44. The supporting means 47 also comprises a cylindrical outside surface 53 on the stem 44 and the surface 53 slidably engages the cylindrical inside surface 51. The inside and outside surfaces 51 and 53 respectively cooperate and define the sole means confining the poppet structure against movements transverse the axes 40 and 46 during movement of the poppet structure 42 along such axes.

As will be readily apparent from FIG. 1 of the drawings the particular diameter 45 is large when compared to the effective diameter 54 of the poppet head 43 and such effective diameter 54 is shown as the median diameter of an O-ring seal 55 carried by the poppet head 44 and as such seal engages a frustoconical inside surface 56 of the adapter flange 22. The large diameter 45 assures that movement of the poppet structure 42 along the axes 40 and 46 is free of tilting movements transverse such axes. In this exemplary embodiment of the invention the effective diameter 54 is preferably no more than five times greater than the particular diameter 45.

Reference is now made, for convenience in the placing of reference numerals on the drawings, to FIG. 5 of such drawings and it is seen that the housing 36 is comprised of a plurality of two component housing parts shown as parts 60 and 61. The cylindrical inside surface 51 is provided on the part 60 and the parts 60 and 61 are held together by a plurality of threaded bolts 62. An annular O-ring seal 63 is disposed in a stepped annular groove at the inner end of part 60 and the seal 63 provides a fluid-tight seal between parts 60 and 61. As will be readily apparent from the drawings the housing part 60 has the flange 21 defined at its outer end while the housing part 61 has the adapter flange 22 defined at its outer end.

The housing part 60 also has an integral deflector 64 (FIG. 5) which has a substantially frustoconical or bullet-nosed configuration provided with an outside surface 65, and the deflector surrounds the inside surface 51. The outside surface 65 of deflector 64 defines one wall of the annular passage 37 through the housing part 60 and the outer wall of that portion of the annular passage 37 associated with the housing part 60 is defined by an inside surface portion 66 of the housing part 60. It will also be seen from FIG. 2 of the drawings that the integral deflector 64 has a plurality of four integral ribs 67 extending between such deflector and the inside surface 66 of the housing part 60. The portion of the annular passage 37 through the housing part 61, once the poppet structure 42 is partially or fully open, is defined by outer surface portions of the head portion of structure 42 and an inside surface 68 in part 61, as shown in FIG. 5.

The poppet structure 42 of the valve assembly 20 is preferably in the form of a single-piece structure; and, such structure has an opening 69 defined therein and as best seen in FIG. 12 of the drawings. The opening 69 is preferably provided in a transition portion 70 of poppet structure 42 between the poppet head 43 and the poppet stem 44. The valve assembly 20 has a roller 71 rotatably supported by the poppet structure 42 within the opening 69 on a pin 72 which is suitably held in position in the poppet structure 42 as will be described subsequently. The roller 71 has an axis of rotation which is coplanar with the axes 40 and 46 and the contact 49 is defined by the outside surface of the roller and as also seen at 74 in FIG. 12.

As previously mentioned the valve assembly 20 has means 50 (FIGS. 1 and 12) for engaging the contact 49 to provide movement of the poppet structure 42 along the axes 40 and 46. As best seen in FIG. 12 the engaging means 50 comprises a shaft 75 carried by the housing 36 and in particular carried by part 60 of housing 36 for rotary movements thereof and an actuator 76 detachably fastened to the shaft 75.

The shaft 75 and actuator 76 have outer annular surfaces 79 and 80 respectively which together define the sole means engaging structural portions associated with the housing 36 to hold the shaft 75 and actuator 76 against movements parallel to the central axis 81 of the shaft 75 while allowing rotary movements of the shaft 75 to enable the actuator 76 to engage the contact 49 defined by the outside surface 49 of the roller 71.

The actuator 76 has a tubular body or hub portion 82 and annular edge 80 defines one end edge of the hub portion 82 while an end edge 83 defines the opposite end edge. The actuator 76 also has an actuating cam finger portion 84 and such cam finger has a precision computer-generated cam surface 85 which engages the contact 49 and provides actuating forces only along axes 40 and 46 throughout the entire actuating range of the actuator 76 and cam surface 85. It will be appreciated that the entire actuating range of the actuator 76 consists entirely of pivoting movements i.e., partial rotary movements which are imparted to the shaft 75 by the actuating handle 33 in a manner to be described in detail subsequently.

The cam surface 85 is made utilizing the latest state-of-the-art computer equipment; and, basically surface 85 is defined by what may be considered an infinite number of points which represent a corresponding number of rotary positions of the cam finger 84 such that at each position of cam finger 84 the force applied by the cam surface 85 against contact 49 is a force which tends to open the poppet structure 42 and is coaxial with the axes 40 and 46.

As previously mentioned the roller 71 is held in position in the opening 69 of the poppet structure 42 by pin 72. The pin may be of any suitable type and thus of a type which is press-fitted in position within associated aligned openings 86 in the poppet structure 42. The pin may also be of a type which has tubular end portions which are particularly adapted for insertion of a flaring tool therein so that once such end portions are inserted in the aligned openings 86 the tubular end portions may be flared to thereby hold the pin 72 and roller 71 in position.

Reference is again made to FIG. 12 of the drawings which shows in isometric view the previously mentioned actuating handle 33 and associated structure and such handle and structure also comprise the engaging means 50. The handle 33 is attached to an outer end 87 of the shaft 75 by a pivot pin 90 which extends through a pair of aligned openings 91 in such handle and a cooperating opening 92 in the end 87 of shaft 75. Once the pivot pin 90 is extended through the openings 91 and 92 a washer 93 is placed in position around the forward end of pin 90 and a spring clip 94 is provided and disposed in a known manner therearound in an annular groove 95 in such forward end of the pin 90 to thereby hold such pin in position and thereby hold the handle 33 on the end of the shaft 75. The handle 33 is used to provide manual rotary movements of the shaft 75 and hence the actuator 76 fastened thereto. Thus, components 33, 75 and 76 define the major components of the engaging means 50.

As previously mentioned the actuator 76 is detachably fastened to the shaft 75 and the means providing such detachable fastening is in the form of pin means shown as a pair of pins each designated by the same reference numeral 96. Each pin 96 extends through an associated bore 100 in the hub portion of the actuator 76 and through an associated bore 101 in the shaft 75 so that once the pins 96 are extended through bores 100 and 101 the actuator 76 is detachably fastened to the shaft 75.

The valve assembly 20 is a normally closed valve assembly which is kept closed by a mechanical compression spring 102 as seen in FIG. 1. The spring 102 acts between an annular surface 103 (FIG. 5) in the housing part 60 of the housing 36 and an annular ledge 104 in the transition portion 70 of the poppet structure 42 to thereby continuously yieldingly urge the poppet structure and in particular the poppet head 43 of such structure toward its closed position so that in such closed position the O-ring seal 55 is in sealed relation against the sealing surface 56 of the adapter flange 22.

The valve assembly 20 is used during unloading operations with the unload coupler 25 attached in position. The handle 33 is then manually rotated to override the compression spring 102 through the action of actuator 76 to thereby allow fluid flow from right to left as shown in FIG. 5 and thereby enable fluid flow from a tank of a tank truck through the valve assembly 20 and through the unload coupler 25. The valve position of FIG. 5 is a partially open position; however, the valve assembly 20 may be opened, utilizing the handle 33, to a plurality of open positions and for this purpose a stop 105 is provided on the valve assembly 20.

The stop 105 is best seen in FIG. 12 and such stop 105 has a threaded end 106 which is threadedly received within a cooperating threaded portion of the housing part 60. The stop 105 also has a smooth rod-like outer portion 107 which is particularly adapted to be engaged by the handle 33, as will now be described.

For the purpose of holding handle 33 and hence valve assembly 20 in a plurality of open positions the handle has recess means shown in this example as a plurality of two cutouts or recesses 110 and 111 which are defined in an inner end portion 112 of such handle. The two recesses 110 and 111 define a corresponding plurality of two holding surfaces 113 and 114 on the inner end portion 112.

In this example, the two recesses 110 and 111 enable the valve assembly 20 to be held in two open positions. In particular, the recess 110 with its holding surface 113 enable holding of the valve assembly 20 in the partially open unload position illustrated in FIGS. 5, 6 and 7. The recess 111 with its holding surface 115 enable holding of the valve assembly 20 in the fully open unload position illustrated in FIGS. 8 and 9.

Referring again to FIG. 12 of the drawings it is seen that the handle 33 has means 115 normally yieldingly urging the holding surfaces 113 and 114 away from the stop 105 and in particular away from the surface 107 of such stop whereby with the holding surfaces 113 and 114 urged away from stop 105 the poppet structure 42 and hence the valve assembly 20 are held closed by spring 102.

As previously mentioned the pin 90 is provided for attaching the handle 33 to the end 87 of the shaft 75 while allowing pivoting movements of such handle about pin 90. The urging mean 115 previously mentioned comprises spring means in the form of a plurality of cupped spring washers 116 cooperating with a plurality of flat washers 117, and a hub member 120 carried concentrically around the shaft 75 adjacent the end 87 thereof. The hub member 120 has a tubular end 121 and a transverse slot means 122 is provided in the end 121. The urging means 115 is installed o the shaft 75 and the pin 90 extends through slot means 122 of the hub member 121 whereby such member cannot rotate relative to the shaft 75. The hub member 120 has a hub axis 125 which coincides with the axis 81 of the shaft 75 and such member 120 comprises a first annular surface 123 disposed in a first plane which is perpendicular to the hub axis 125 and a second annular surface 124 disposed in a second plane which is at an angle to the hub axis 125. The second annular surface or angled surface 124 engages the handle 33 and serves to hold such handle with its holding surfaces 113 and 114 away from the stop 105 due to the action of the spring means 115 urging the hub member 120, i.e. angled surface 124 of member 120, against the handle and thereby causing pivoting movement of the inner end portion 112 of the handle away from the stop 105.

With above-described action by the urging means 115, the handle 33 is always urged so that the holding surfaces 113 and 114 thereof are away from the stop 105 unless such surfaces are physically placed against such stop by an operator. Thus, the handle 33 is ineffective to hold the shaft 75 in any particular position unless a valve operator overrides the spring 102. If an operator does not override spring 102 the valve assembly 20 is always in its closed position.

To partially open the valve assembly 20 from its closed position to the position shown in FIGS. 5, 6 and 7 the handle 33 is grasped by an operator and rotated so that recess 110 is aligned opposite the stop 105 whereupon the handle is pivoted about its pivot pin 90 so that the outer portion of the handle 33 is normally moved toward the operator and the holding surface 113 is engaged against surface 107 of the stop 105. In this position, fluid flow through the valve assembly 20 is from right to left, essentially as shown by the arrows F in FIG. 5.

To fully open the valve assembly 20 from the partially open position of FIG. 5, the operator grasps the outer end of handle 33 and first pivots such outer end about pivot pin 90 until the holding surface 113 is moved away from pin 105. The operator then continues rotation of handle 33 until the recess 111 thereof is aligned with the stop pin 105 whereupon the handle is again pivoted above the pivot pin 90 until holding surface 114 engages the stop 105 to thereby hold the valve assembly 20 in its fully open position, which is the position illustrated in FIGS. 8 and 9. It will be appreciated that flow of fluid in such fully open position is also from right to left as shown by the flow arrows F in FIG. 8. It will be appreciated that in each instance that the handle 33 is actuated to rotate the shaft 75 forces are transmitted through the hub portion 83 of actuator 76 to its finger portion 84 and in turn to roller 71 by means of cam surface 85 to thereby override the compression spring 102. Once the valve assembly 20 has been either partially opened or fully opened, the force required to keep the spring compressed acts back through the system and through either holding surface 113 or 114 against the stop 105 and in particular surface 107 of such stop and such force is sufficient that the frictional contact between either surface 113 or 114 and stop 105 is sufficient to hold the lever against the stop even with the urging means tending to urge portion 112 away from the stop 105.

As previously mentioned the engaging means 50 comprises the shaft 75 and the actuator 76 and such shaft and actuator have outer annular surfaces 79 and 80 respectively which together define the sole means engaging structural portions associated with the housing to hold the shaft and actuator against movements parallel to the central axis 81 of the shaft while allowing rotary movements of the shaft to enable the actuator 76 to engage the contact 49. The structural portions associated with the housing 36 referred to consist of an annular surface 129 (FIG. 2) provided on a portion 126 of part 60 of housing 36 and other structural portions comprising a tubular member 127 and a wavy spring member 130 which are disposed concentrically around the shaft 75. The spring member 130 is sandwiched between an annular surface 131 (FIG. 4) on housing part 60 of housing 36 and tubular member 127 once the actuator 76 is installed in position on shaft 75.

The actuator 76 is readily installed on the shaft 75 using the structure of this invention and such shaft 75 and actuator are held against movements parallel to the central axis 81 of such shaft. The housing part 60 has a bore 132 in an integral bass 133 thereof. It is a comparatively simple matter to install and hold the poppet structure 42 in position by compressing spring 102. After disposing members 136 and 141 thereon, the shaft 75 is then partially inserted through bore 132 and actuator 76, member 127, and spring washer 130 disposed therearound. A reduced diameter portion 135 of shaft 75 is then disposed in a bore 136 (FIG. 2) in housing part 60 so that annular surface 79 is disposed adjacent surface 129. Finger portion 84 of actuator 76 is disposed in opening 69. The outer end of shaft 75 is then held against axial movement and hub portion 82 is positioned axially until bores 100 therein are aligned with the bore 101 in the shaft 75 whereupon the pins 96 are installed in position. The construction and arrangement of parts are such that once the hub portion is pinned in position by pins 96 of the shaft 75 and actuator 76 are effectively held axially solely by annular surface 79 engaging annular surface 129 and annular surface 80 engaging member 127 which is held axially in position by spring member 130 engaging the surface 131 previously described. The pins 96 are easy to install in position, particularly with housing 36 being in two parts.

As seen in FIG. 12, the valve assembly 20 also has the previously mentioned member 136 which is a tubular flanged collar 136 disposed around the outer end portion of the shaft 75. The flanged collar 136 is held in position by an integral annular projection 137 provided on the shaft and which engages the outer surface 140 on the flange portion of collar 136. Member 141 is an O-ring seal 141 provided so that it is disposed between the inner end edge of the collar 136 and an annular surface 142 provided adjoining the inner edge of the cylindrical bore 132 in the boss 133.

In using the valve assembly 20 of this invention an operator would normally manually actuate such assembly by the handle 33 so that the handle would be closer to the operator than the remainder of the valve assembly. Should the operator, for any reason, lose his grasp of the handle 33 the urging means 115 will operate such that the outer portion of such handle will be urged away from the operator and thus not tend to whip such operator.

As mentioned earlier, to open the valve assembly 20 the compression spring 102, which normally holds the poppet structure 42 closed, is overridden by the finger portion 84 of cam actuator 76 engaging contact 49 on the roller 71 whereupon the poppet structure 42 is moved so that the poppet head 43 and its O-ring seal 55 are moved away from sealing surface 56 of the adapter flange 22. In the partially open position of FIG. 5 the movement of the poppet structure is partial and in the fully open position of FIG. 8 the movement of the poppet structure is substantially the maximum possible opening movement thereof.

As previously indicated the poppet valve assembly 20 may also be used to load a fluid, such as gasoline, in a tank truck. In this mode of operation instead of fluid flow being from right to left as shown in FIGS. 5 and 8, fluid flow is from left to right as shown in FIG. 10. To use the valve assembly 20 as a loading valve a load coupler is detachably fastened to the adapter flange 22 as will now be described.

The load coupler 35 is basically a standard coupler of a type known in the art and does not comprise any part of this invention. The load coupler has a pair of pivoted cam arms or cams 146 which are pivoted on associated pivot pins 147 and the cam arms 146 are actuated by a pair of associated linkage assemblies 150. The linkage assemblies 150 are connected to a common shaft (not shown) which is in turn rotated by a manually operated handle (also not shown) so that upon rotating the handle in one direction a pair of links 151 of the linkage assemblies 150 are moved to the right as shown by the arrows 152 in FIG. 10 causing the cam arms 146 to be pivoted about their pivot pins 146 whereby the working ends of such cam arms engage annular surface 27 of the adapter flange and clamp the load coupler 35 in position thereagainst. During this clamping action an annular gasket seal 153 comprising the load coupler 35 engages a planar annular outside surface 154 on the adapter flange 22 to provide a fluid-tight seal between the load coupler 35 and the valve assembly 20.

The above-mentioned load coupler handle that is moved to thereby move the linkage assembly 150 and thus move links 151 which provide a locking of the cam arms 146 also simultaneously opens a poppet 155 of the load coupler 35 and the construction and arrangement of such load coupler is such that movement of its poppet 155 does not occur until the gasket seal 153 provides the above-mentioned seal between the load coupler 35 and valve assembly. The poppet 155 is connected to the load coupler handle by a suitable linkage 156 of which only the forward end thereof is shown in FIG. 10.

Once the load coupler 35 is coupled in sealed relation to the valve assembly 20 the poppet 155 engages the poppet head 43 thereby overriding the compression spring 102 and moving the poppet head 43 away from surface 56 of the adapter flange 22. This movement of the poppets allows flow of fluid which is in a supply tank associated with the load coupler 35 to flow from left to right, as indicated by arrows F in FIG. 10, and thus through the valve assembly 20 and into the tank of the tank truck.

During the loading operation shown in FIG. 10, the handle 33 is yieldingly urged by urging means 115 so that its lower or inner portion 112 is away from the stop 105, as shown at 157 in FIG. 11. Because the handle 33 is operatively connected through contact 49 of roller 71, actuator 76, and shaft 75 to the poppet structure, the handle 33 is simply rotated to whatever position the poppet structure 42 is moved by the poppet 155 during the loading operation. In essence, the handle 33 simply goes along for the ride during a loading operation.

As mentioned above, the handle 33 is yieldingly urged by the urging means 115 so that its inner end portion 112 is kept away from the stop 105. This assures that the handle 33 will not obstruct opening movement of the poppet structure 42 during a loading operation. Once the load coupler 35 is disconnected, the urging means 115 still keeps the handle away from the stop 105 in a positive manner whereby the spring 102 provides a positive and rapid closing of the poppet structure and hence of the valve assembly 20.

The load coupler 35 illustrated in FIG. 10 and described herein is only one exemplary embodiment of a load coupler which may be used to provide a loading operation; and, it is to be understood that any suitable load coupler may be used, provided that it can be coupled into sealing engagement with the adapter flange 22 and has components which can override the spring 102 and move the poppet structure 42 away from its closed position.

In this disclosure of the invention the means supporting the poppet structure during movement thereof along axes 40 and 46 has been described as comprising a cylindrical inside surface 51 provided on the housing 36 and a cylindrical outside surface 53 on the stem 44 of the poppet structure 42 which slidably engages the inside surface 51. However, a modification of this invention is illustrated in FIG. 1A of the drawings and in this modification it will be seen that the valve assembly 20 is provided with antifriction sleeve 160 carried by the housing part 60 of the housing 36. The antifriction sleeve 160 has an inside cylindrical surface which is also designated by the reference numeral 51 and is particularly adapted to receive the outside surface 53 of the stem 44 thereagainst.

The sleeve 160 is basically in the form of a sleeve bearing made of a suitable antifriction anti-galling plastic material which is compatible with the fluid to be associated therewith. The sleeve 160 has a frustoconical end 161 defined as an integral part thereof which defines an annular shoulder 162. The sleeve 160 may be easily installed in position in a conventional press by relatively moving the housing portion 60 and sleeve 160 until shoulder 162 of sleeve end 161 snaps in position against the annular edge 163 of the integral deflector 64 of housing portion 60. The sleeve 160 has an integral flange 165 at the end thereof opposite end 161 which facilitates installation of such sleeve. The sleeve 160 may also be readily removed in a press and replaced with a new sleeve. Once installed in housing portion 60 the sleeve 160 is basically locked against axial movement by its annular flange 165 and shoulder 162 engaging housing portion 60.

The shape of the end 161 of the sleeve 160 is such that it blends smoothly with the outside surface of the substantially frustoconical deflector 64 and as shown at 166 to thereby allow smooth fluid flow therearound. In addition, the antifriction sleeve 160 helps improve the wear life between the poppet structure 42 and housing part 60 to help increase the overall operating life of the valve assembly 20.

Thus, it is seen that this invention provides a new valve assembly 20 which can be used both as a loading valve and an unloading valve for gasoline tank trucks, or the like. Further, this invention also provides a new method of making such valve assembly.

Reference is next made to FIGS. 13-17 for a description of an alternate embodiment of control mechanism for opening the poppet valve. In FIG. 13 the various components of the embodiment of FIGS. 1-12 are again described to the extent necessary for an understanding of this alternate control mechanism.

Referencing FIG. 13, the present poppet valve is indicated generally by reference character 10. It comprises a housing 212 formed by castings 214, 216, which are joined by bolts 218. The housing 212 defines a fluid flow path through the valve 210, with flow being controlled by a poppet 220.

The poppet 220 comprises a head 222 having an O-ring 224 which is adapted to sealingly engage a valve seat 226 formed on the housing member 214. The poppet 220 also comprises a stem 228 which is slidably mounted in a bore 230 formed in a deflector 232 which is connected to the outer wall of the housing member 216 by radial ribs 234. The poppet 220 and deflector 232 define the internal bounds of what is an annular fluid flow path through the valve 210. A spring 236, acting between the deflector 232 and a ledge on the poppet 220, yieldingly holds the O-ring 224 in sealing engagement with the valve seat 226 to prevent flow of fluid through the valve.

In its use with a gasoline tank truck, the valve 210 is normally mounted on the discharge conduit of the truck's tank. To this end the housing member 216 has a flange 238 which is secured, by bolts 240, to a corresponding flange 242 found on the tank truck and defining the outlet of the tank's discharge conduit.

The other end of the valve 210 is provided with a coupling flange 244 having a standard configuration adapted for connection with standardized couplers. In FIG. 13 an unload coupler 46 is shown connected to the valve 210. The coupler is mounted on a hose (not shown) which is to direct gasoline into the storage tank of a filling station. The coupler 46 comprises a plurality of cam clamps 248 which are swung into engagement with an undercut surface on the flange 244 to obtain sealing engagement between mating annular surface on the coupler 46 and flange 244.

After an unload coupler has been mounted on the valve 210, as indicated in FIG. 13, discharge of fluid (unloading) from the tank truck is affected by manually displacing the poppet head 222 away from the valve seat 226, against the action of the spring 236. The control mechanism serving this function comprise a finger which projects into an opening in the poppet 220, intermediate the head 222 and stem. A roller 252 is mounted within this opening for rotation about an axis which lies in a plane coincident with and normal to the axis of the stem. The finger 250 has a hub 254 which is secured to an actuation shaft 255 by a pin 256, see FIG. 15.

The actuation shaft 255 is journaled on the housing member about an axis which is parallel to the axis of the roller 252. More specifically, one end of the shaft 255 is received by a bore 258 internally of the housing member 216. The other end of the shaft 255 extends exteriorly of the housing and is journaled by a bearing bushing 260 mounted in the housing member 216.

Figure 14:
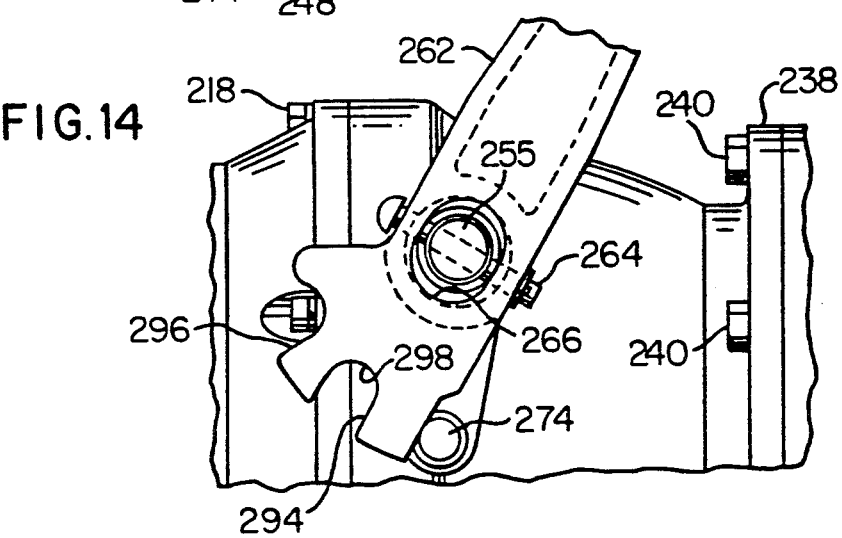
FIG. 14 is a fragmentary elevation of the poppet valve seen in FIG. 13.
Figure 15:
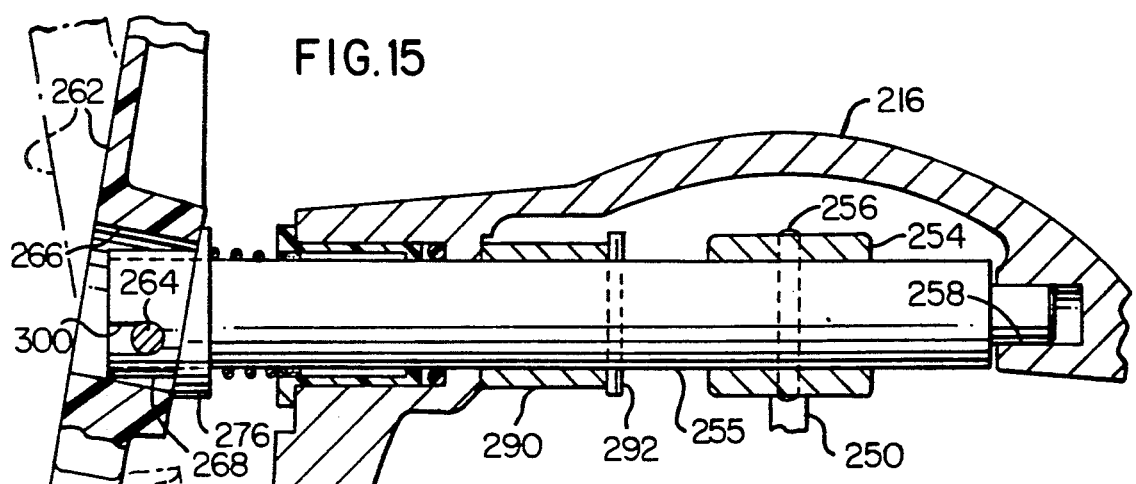
FIG. 15 is a fragmentary section, on an enlarged scale, taken on line 15—15 in FIG. 13.
Figure 16:
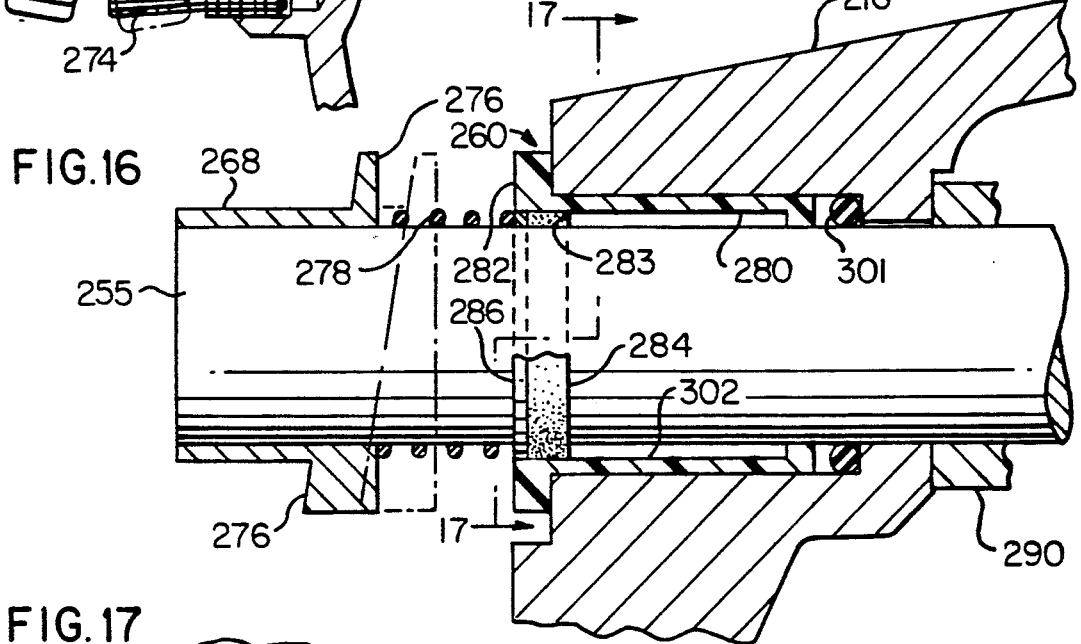
FIG. 16 is a fragmentary section, on a further enlarged scale, also taken on line 15—15 in FIG. 13.
Figure 17:
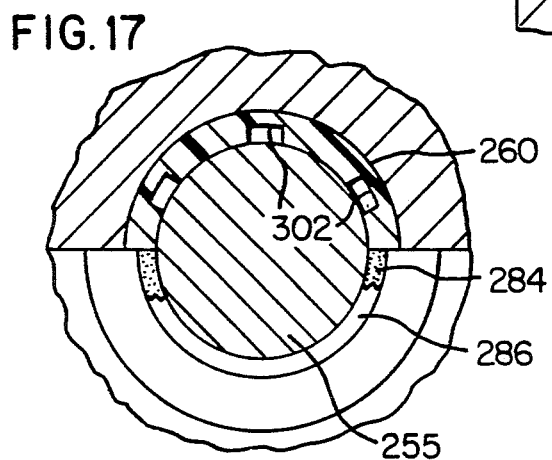
FIG. 17 is a section taken on line 17—17 in FIG. 16.

A handle 262 is mounted on the outer end of the actuation shaft 255 by a pin 264, see also FIG. 14. The handle 262 is provided with elliptical opening 266 which receives the shaft 255 and a sleeve 268 slidably mounted on that shaft. The handle 262 is thus positively connected to the actuation shaft 255 in a radial sense and yet is free to be pivoted normally thereto in a plane parallel to the axis of that shaft, for purposes yet to be described.

From the description to this point, it will be apparent that rotation of the handle 262, in a counterclockwise direction from the position shown in FIGS. 13 and 14 will result in the same rotation of the finger 250. As the finger 250 is so rotated, its roller engaging surface 270 displaces the poppet toward the right, displacing the poppet head 222 away from the valve seat 226.

It is to be noted that the described poppet control mechanism has the advantage of essentially eliminating any forces which would tend to cock the poppet and inhibit its free movement towards either a closed or open position. Thus the portions of the poppet which are subject to fluid pressures are symmetrical about its central, longitudinal axis and the force exerted by the finger 250 is imparted to the roller 252 is on a line normal to and intersecting the axis of the poppet.

The process of unloading gasoline to fill an underground storage tank involves more time than is convenient for the poppet to be manually held in an open position. Thus means are provided for locking the poppet in its open position during an unloading operation. To this end the handle 262 is provided with a lower, locking portion 272, which, by reason of its pivotal connection with the shaft 255, is selectively engageable with a stop pin 274, FIGS. 14 and 15.

It is desired that the locking portion 272 be spaced outwardly from the stop pin 274 unless and until the handle has been rotated to a position in which it is desired that the poppet be locked. To this end the sleeve 268 is provided with an angled flange 276 which engages the surface of the handle facing the housing 212 and yieldingly held thereagainst by a spring 278.

Referencing again the bearing bushing 260, it will be seen that it is received, by a press fit in a bore 280 in the housing member 216, with its inward position being determined by a flange 282. The flange 282 has a counterbore 283 which receives an annular felt seal 284 and a washer 286. The spring 278 bears against the washer 286 and, through the pin 264, exerts an outward (leftward) force on the shaft 255. This axial force is opposed by and the shaft 255 is axially positioned by a spacer sleeve 290 and pin 292, extending through the shaft 255. The force of the spring 278 thus, ultimately, results in the shaft 255 being axially positioned by engagement of the spacer with the inner surface of the housing member 216.

Again, when its is desired to lock the poppet 220 in an open position, the handle is pivoted relative to the pin 264. There are two locking surfaces on the locking portion 272, identified by reference characters 294, 296. When the handle is rotated to a position in which the locking surface 294 has been rotated to the right of the stop pin 274 (and registered with a slot 298 which forms the surface 294) the handle 262 is pivoted relative to the pin 264 and the locking portion 272 brought into the plane of the stop pin 274. The handle is then released and the poppet valve spring 236, acting throught the shaft 255, maintains the surface 294 in engagement with stop pin and the poppet locked in an open position. Preferably the pin 274 is outwardly flared to maintain the handle, and the poppet, in this open position.

Locking surface 294 sets the poppet in a partially open position wherein flow through the valve is throttled. Where a faster flow is desired, the handle 262 would be further rotated to a position wherein there is a maximum flow rate through the valve and then locked in that position by similarly engaging the locking surface 296 with the stop pin 274.

It will be apparent that when the handle is pivoted relative to pin 264, to a locking position, the sleeve is displaced, relative to the shaft 255, to the phantom position indicated in FIG. 14. To accommodate this axial movement, the pin 264 is received by a slot 300 in the sleeve 268.

This locking arrangement has the advantage of being quickly released in order to shut off flow of gasoline, a feature particularly advantageous in the event of some mishap during an unloading operation. This end is simply accomplished by a relatively light force on the handle 262 to pivot the locking portion outwardly and disengage the locking surface 294 or 296. The spring 278, acting through the angled flange 276, assists in pivoting the locking portion 272 away from the stop pin 274 and then maintains it in spaced relation therefrom. With the locking portion 272 thus released, the poppet spring 236, returns the poppet head 222 into sealing relation with the valve seat 226 to prevent further flow of gasoline through the valve 210.

A high degree of reliability is provided by the present valve control mechanism. The use of a compression spring (278) to bias the locking portion (272) of the handle out of engagement with the stop means (274) is one feature contributing to this reliability. A second feature contribution to reliability is found in the manner in which the actuating shaft (255) is journaled to minimize, if not eliminate, any tendency of the shaft to bind, i.e., to have sufficient friction to prevent its free rotation so that closing movement of the poppet structure (220) would be slowed or prevented.

In this latter connection, reference is again made to the bearing bushing 260 which provides the primary rotative support for the actuating shaft 255. This bushing is mounted in a bore in the housing member 216. The actuating shaft 255 passes through an opening in the housing member 216, with an O-ring 301 providing a fluid seal for pressurized fluid within the poppet valve housing 212. In practice, the internal pressure, acting against the O-ring 301, displaces it to engage the bushing 260 and provides a force tending to displace the bushing outwardly from the housing member 216. This outward displacing force is opposed by the spring 278 and the friction forces effective on the bushing 260. Generally the internal pressure, tending to displace the bushing 260 outwardly, is insufficient to displace the bushing from its illustrated normal position. Even should the internal pressure be sufficient to displace the bushing 260, the amount of displacement would be limited to an acceptable distance by bottoming of the coils of the spring 278. If this were to occur, fluid pressure would provide the resilient force holding the locking portion 272 out of engagement with the stop pin 274. Additionally, the force of the spring 278 is insufficient to disengage the locking portion 272 from the stop pin 274. Once it is engaged therewith to lock the poppet in an open position.

In any event, the bushing 260 provides a highly effective, anti-friction journal for the shaft 255 through the provision of the felt seal 284 which is compressed against the bottom of the counterbore 283. This spring force compensates for any tendency of the felt seal to wear and thus maintains its effectiveness in preventing the entry of dirt, or other foreign matter between the mating, journal surfaces of the shaft 255 and the bushing 260. The integrity of these bearing surfaces is thus preserved through a long working life.

The working life of these bearing surfaces is further preserved through the provision of a plurality of longitudinal grooves 302 in the bearing surface of the bushing 260. Should dirt, or other foreign matter work its way between these journal surfaces, it will work its way into the grooves 302 before any substantial damage is done to these surfaces which would increase the friction thereof.

Materials for felt dirt, or dust, seals are well known in the art. Any or several available materials can be selected by one skilled in the art for the seal 284. The material for the washer 286 and the bearing bushing 260 is a structure resinous material, exemplified by acetal.

While the forms and methods of this invention now preferred have been illustrated and described as required by the Patent Statute, it is to be understood that other forms and method steps can be utilized and still fall within the scope of the appended claims wherein each claim sets forth therein what is believed to be known in the art prior to this invention in that portion of each claim that is presented before the term "the improvement" and sets forth what is believed to be new in the art according to this invention in that portion of each claim that is presented after the term "the improvement" whereby it is believed that each claim sets forth a novel, useful, and unobvious invention within the purview of the Patent Statute.

Having thus described the invention, what is claimed as novel and desired to be secured by Letters Patent of the United States is:

1. A poppet valve assembly having a flow passage therethrough and comprising
   a housing comprising first and second parts compositely defining the outer bounds of the flow passage, which is formed concentrically of a central axis,
   said housing parts being sealingly joined at a plane normal to said central axis,
   one of said housing parts having, adjacent the outer end thereof, an annular valve seat defining a portion of said flow passage,
   a single piece poppet structure having
      a head, having an effective diameter, sealingly engageable with said valve seat and
      a stem, having an outer end portion of a given diameter, projecting from said head in a direction away from said valve seat,
      said head and stem being formed concentrically of a central axis, with the effective diameter of the head being no greater than five times the given diameter of the stem,
   journal means for mounting said poppet structure for movement of the head towards and away from the valve seat,
   said journal means being disposed centrally of the flow passage and connected to the second housing part by radially extending members,
   said journal means having a bore concentric of the central axis of the flow passage,
   said bore slidably receiving an end portion of the stem and aligning the central axis of the poppet structure with the central axis of the flow passage, and actuator means for displacing said head away from said valve seat, said actuator means comprising a transverse opening formed in said stem, intermediate said head and the end portion which is slidably received by the bore of said journal means, a roller rotatably mounted in said slot on an axis normal to and intersecting the central axis of the poppet structure, an actuator shaft pivotally mounted on said second housing part about an axis parallel to the roller axis, a handle secured to said actuator shaft exteriorly of said housing, and a cam finger secured to said actuator shaft and extending into said slot, said cam finger having a curved cam surface engageable with said roller, the curvature of said cam surface being such that contact thereof with the roller is aligned with the central axis of the poppet structure, as the actuator shaft is rotated by the handle to cause the finger to displace the poppet structure head away from the valve seat.

2. A poppet valve assembly as in claim 1 wherein an annular spring seat is formed on the poppet valve structure intermediate said roller and said end portion of the stem, and a spring seat is formed on said journal means, and further comprising a compression spring disposed between said spring seats and urging said head towards said valve seat.

3. A poppet valve assembly as in claim 2 wherein said journal means comprises an integral annular deflector which progressively increases in diameter from its end remote from the valve seat in a direction towards the valve seat in surrounding relation to said spring.

* * * * *